US012616908B2

(12) United States Patent
Schattle

(10) Patent No.: US 12,616,908 B2
(45) Date of Patent: May 5, 2026

(54) SPINNING TOP ATTACHMENT DEVICE FOR WRITING AND DRAWING INSTRUMENTS

(71) Applicant: Locomotion Creations LLC, Vineland, NJ (US)

(72) Inventor: Travis Schattle, Vineland, NJ (US)

(73) Assignee: Locomotion Creations LLC, Vineland, NJ (US)

( * ) Notice: Subject to any disclaimer, the term of this patent is extended or adjusted under 35 U.S.C. 154(b) by 199 days.

(21) Appl. No.: 18/767,350

(22) Filed: Jul. 9, 2024

(65) Prior Publication Data

US 2025/0032941 A1 Jan. 30, 2025

Related U.S. Application Data

(60) Provisional application No. 63/528,573, filed on Jul. 24, 2023.

(51) Int. Cl.
*A63H 1/02* (2006.01)
*B43K 29/00* (2006.01)

(52) U.S. Cl.
CPC ............... *A63H 1/02* (2013.01); *B43K 29/00* (2013.01)

(58) Field of Classification Search
CPC ............. A63H 1/02; A63H 1/12; B43K 29/00
USPC ......................... 446/256, 259, 261–263, 266
See application file for complete search history.

(56) References Cited

U.S. PATENT DOCUMENTS

| | | | | | |
|---|---|---|---|---|---|
| 245,141 | A * | 8/1881 | Dannhorn | A63H 1/02 | 446/259 |
| 4,906,216 | A * | 3/1990 | Abeshouse | A63H 1/00 | 446/256 |
| 5,324,226 | A * | 6/1994 | McKay | A63H 1/16 | 446/256 |
| 5,498,192 | A | 3/1996 | McKay et al. | | |
| 6,743,070 | B1 * | 6/2004 | Lin | A63H 33/28 | 446/259 |
| 9,950,556 | B1 * | 4/2018 | Laemle | B43K 23/08 | |
| 2016/0310854 | A1 * | 10/2016 | Kubo | A63H 1/04 | |
| 2020/0324215 | A1 * | 10/2020 | Cardona Rivera | A63H 29/20 | |
| 2022/0096946 | A1 * | 3/2022 | Correas | A63H 1/20 | |

FOREIGN PATENT DOCUMENTS

JP 2021108855 A * 8/2021

OTHER PUBLICATIONS

Subway Kids Pak, DoodleTop Jr. The Top That Draws!, photograph of product, 1994, U.S.

(Continued)

*Primary Examiner* — Peter M Poon
(74) *Attorney, Agent, or Firm* — Greenberg Traurig, LLP

(57) ABSTRACT

A spinning top attachment device includes a top having a top base and a collet removably attached to the base. The collet has a pinion gear portion. A bore of the collet and a bore of the top base are sized and shaped to removably receive a drawing instrument, and the collet is configured to secure the drawing instrument to the top. A pull stick is sized and shaped to mesh with the pinion gear portion of the collet. The top and the drawing instrument, when assembled with one another, are configured to spin relative to a surface when the pull stick is pulled relative to the pinion gear portion, and the drawing instrument is configured to spin on and create a design on the surface.

20 Claims, 15 Drawing Sheets

(56) References Cited

OTHER PUBLICATIONS

The Toy Network, Spinning Top Marker, photograph of product.
Crayola, Dinosaurs 5-in-1 Creativity Kit, photograph of product.
DoodleTop, The Top That Draws!, Twister Deluxe Kit, photograph of product.
DoodleTop, UCreate, The Top That Draws!, pen and top, photograph of product.
Kidea, Spinning Markers, photograph of product.

* cited by examiner

SPINNING TOP ATTACHMENT DEVICE FOR WRITING AND DRAWING INSTRUMENTS

CROSS-REFERENCE TO RELATED APPLICATION

This application is a Section 111 (*a*) application relating to and claiming the benefit of commonly owned, U.S. Provisional Patent Application Ser. No. 63/528,573, filed Jul. 24, 2023, entitled "Spiral Tops-A spinning top toy that is secured onto common writing utensils, and is then spun with a device to draw spirals on paper," the contents of which is incorporated herein by reference in its entirety.

FIELD OF THE INVENTION

The present invention relates to writing and drawing instruments and utensils and, more particularly, spinning top attachment devices for writing and drawing instruments and utensils to facilitate the rotation of the instruments and utensils on a drawing surface for the creation of designs, patterns, and artwork.

BACKGROUND

Writing and drawing instruments and utensils, such as markers, pens, crayons, and pencils, are used to create artistic and pictorial designs and patterns on a drawing surface.

SUMMARY

In some embodiments, a spinning top attachment device includes a top including a top base having an upper end, a lower end opposite the upper end, a bore extending from the upper end to the lower end, and a collet having a first end, a second end opposite the first end, a bore extending from the first end to the second end, and a pinion gear portion having a first plurality of teeth, wherein the collet is removably attached to the top base, wherein the bore of the collet is coextensive with the bore of the top base, wherein the bore of the collet and the bore of the top base are sized and shaped to removably receive a drawing instrument, wherein the collet is configured to secure the drawing instrument to the top; and a pull stick having a second plurality of teeth, wherein the second plurality of teeth of the pull stick is sized and shaped to mesh with the first plurality of teeth of the pinion gear portion of the collet, wherein the top and the drawing instrument, when assembled with one another, are configured to spin relative to a surface when the pull stick is pulled relative to the pinion gear portion, and wherein the drawing instrument is configured to spin on and create a design on the surface.

In some embodiments, the collet includes a plurality of external threads, wherein the top base includes a plurality of internal threads, and wherein the external threads of the collet threadedly engage the internal threads of the top base. In some embodiments, the collet being moveable from an advanced position, in which the collet is configured to grip the drawing instrument, and a retracted position, in which at least a portion of the collet is retracted from the top base and in which the collet is configured to release the drawing instrument. In some embodiments, the collet includes a plurality of collet fingers at the second end of the collet, and wherein the plurality of collet fingers is sized and shaped to grip the drawing instrument when the collet is in its advanced position. In some embodiments, the drawing instrument is axially moveable relative to the top when the collet is in its retracted position.

In some embodiments, the spinning top attachment device further includes a first wrench, wherein the first wrench is configured to engage and move the collet to and from its retracted position and its advanced position. In some embodiments, the first end of the collet includes at least one groove, wherein the first wrench includes at least one tab, and wherein the at least one tab of the first wrench is sized and shaped to mate with a corresponding one of the at least one groove of the collet. In some embodiments, the spinning top attachment device further includes a second wrench, wherein the second wrench is configured to engage the top base. In some embodiments, the lower end of the top base includes at least one groove, wherein the second wrench includes at least one tab, and wherein the at least one tab of the second wrench is sized and shaped to mate with a corresponding one of the at least one groove of the top base.

In some embodiments, the spinning top attachment device further includes a handle having a first end and a second end opposite the first end of the handle, wherein the second end of the handle includes an interior wall forming a first aperture, and wherein the first aperture of the handle is sized and shaped to removably receive the collet. In some embodiments, the handle includes a first side, a second side opposite the first side, and a slot extending from the first side to the second side, wherein the slot is sized and shaped to receive the pull stick. In some embodiments, the slot extends from a first opening formed within the first side to a second opening formed within the second side, wherein the slot includes a third opening extending within the interior wall, and wherein the first plurality of teeth of the pinion gear portion of the collet is substantially aligned with the third opening of the slot. In some embodiments, the slot has a width, wherein the collet has an outer diameter, and wherein the width of the slot and the outer diameter of the collet are sized and shaped to provide a space between the outer diameter of the pinion gear portion and interior wall, and wherein the space is sized and shaped to receive the pull stick.

In some embodiments, the first aperture of the handle has an inner diameter, wherein the inner diameter of the first aperture provides clearance between the outer diameter of the collet and the interior wall of the handle to enable the top to spin and rotate when the pull stick is pulled. In some embodiments, the clearance between the outer diameter of the collet and the interior wall of the handle enables the top to disengage from the handle when the pull stick is fully disengaged from the top. In some embodiments, the drawing instrument is a marker, a pen, a pencil, a crayon, chalk, or a charcoal drawing instrument. In some embodiments, the drawing instrument includes a 5 tip, and wherein the tip extends from the lower end of the top base. In some embodiments, the top base is frustoconical in shape.

In some embodiments, a kit includes a top including a top base having an upper end, a lower end opposite the upper end, a bore extending from the upper end to the lower end, and a collet having a first end, a second end opposite the first end, a bore extending from the first end to the second end, and a pinion gear portion having a first plurality of teeth, wherein the collet is removably attached to the top base, wherein the bore of the collet is coextensive with the bore of the top base, wherein the bore of the collet and the bore of the top base are sized and shaped to removably receive a drawing instrument, wherein the collet is configured to secure the drawing instrument to the top; at least one wrench, wherein the at least one wrench is configured to attach the collet to the top base and remove the collet from the top base; a handle having a first end, a second end opposite the first end of the handle, wherein the second end of the handle includes an interior wall forming a first aperture, wherein the first aperture of the handle is sized and shaped to removably receive the collet, and a slot formed within the second end of the handle; and a pull stick having a second plurality of teeth, wherein the slot of the handle is sized and shaped to receive the pull stick, wherein the second plurality of teeth of the pull stick is sized and shaped to mesh with the first plurality of teeth of the pinion gear portion of the collet, wherein the top and the drawing instrument, when assembled with one another, are configured to spin relative to a surface when the pull stick is pulled relative to the pinion gear portion, and wherein the drawing instrument is configured to spin on and create a design on the surface.

In some embodiments, a system includes a drawing instrument; and a top including a top base having an upper end, a lower end opposite the upper end, a bore extending from the upper end to the lower end, and a collet having a first end, a second end opposite the first end, a bore extending from the first end to the second end, and a pinion gear portion having a first plurality of teeth, wherein the collet is removably attached to the top base, wherein the bore of the collet is coextensive with the bore of the top base, wherein the bore of the collet and the bore of the top base are sized and shaped to removably receive the drawing instrument, wherein the collet is configured to secure the drawing instrument to the top; a handle having a first end, a second end opposite the first end of the handle, wherein the second end of the handle includes an interior wall forming a first aperture, wherein the first aperture of the handle is sized and shaped to removably receive the collet, and a slot formed within the second end of the handle; and a pull stick having a second plurality of teeth, wherein the slot of the handle is sized and shaped to receive the pull stick, wherein the second plurality of teeth of the pull stick is sized and shaped to mesh with the first plurality of teeth of the pinion gear portion of the collet, wherein the top and the drawing instrument, when assembled with one another, are configured to spin relative to a surface when the pull stick is pulled relative to the pinion gear portion, and wherein the drawing instrument is configured to spin on and create a design on the surface.

In some embodiments, the present invention enables users to secure a spinning top onto common writing and drawing utensils and instruments which are then spun to make art designs. In some embodiments, a user can select and change the height of where the top is attached to the writing utensil, and change the resulting spiral pattern that is drawn on paper from the top.

In some embodiments, the top is installed and clamped around the outside of the writing utensil. In some embodiments, a collet and a top base are secured together and clamp down on the writing utensil by reducing the bore diameter of the top and squeezes against the writing utensil. In some embodiments, the clamping mechanism allows users to quickly and easily swap the device between different brands and colors of writing utensils, allowing for hundreds of color combinations. In some embodiments, the toy top devices are sized so that they can fit on common writing utensils, including markers, pens, pencils, chalk, crayons, etc. In some embodiments, users are able to play with the tops using their existing collection of writing utensils, without permanently altering the writing utensil which can be reused again and again. In some embodiments, the clamping mechanism allows users to adjust the height of the writing utensil relative to the top. In some embodiments, by adjusting the height of the writing utensil in the top and adjusting the center of gravity of the top, the user can achieve different spiral patterns once the top is spun.

DETAILED DESCRIPTION

Figure 1:
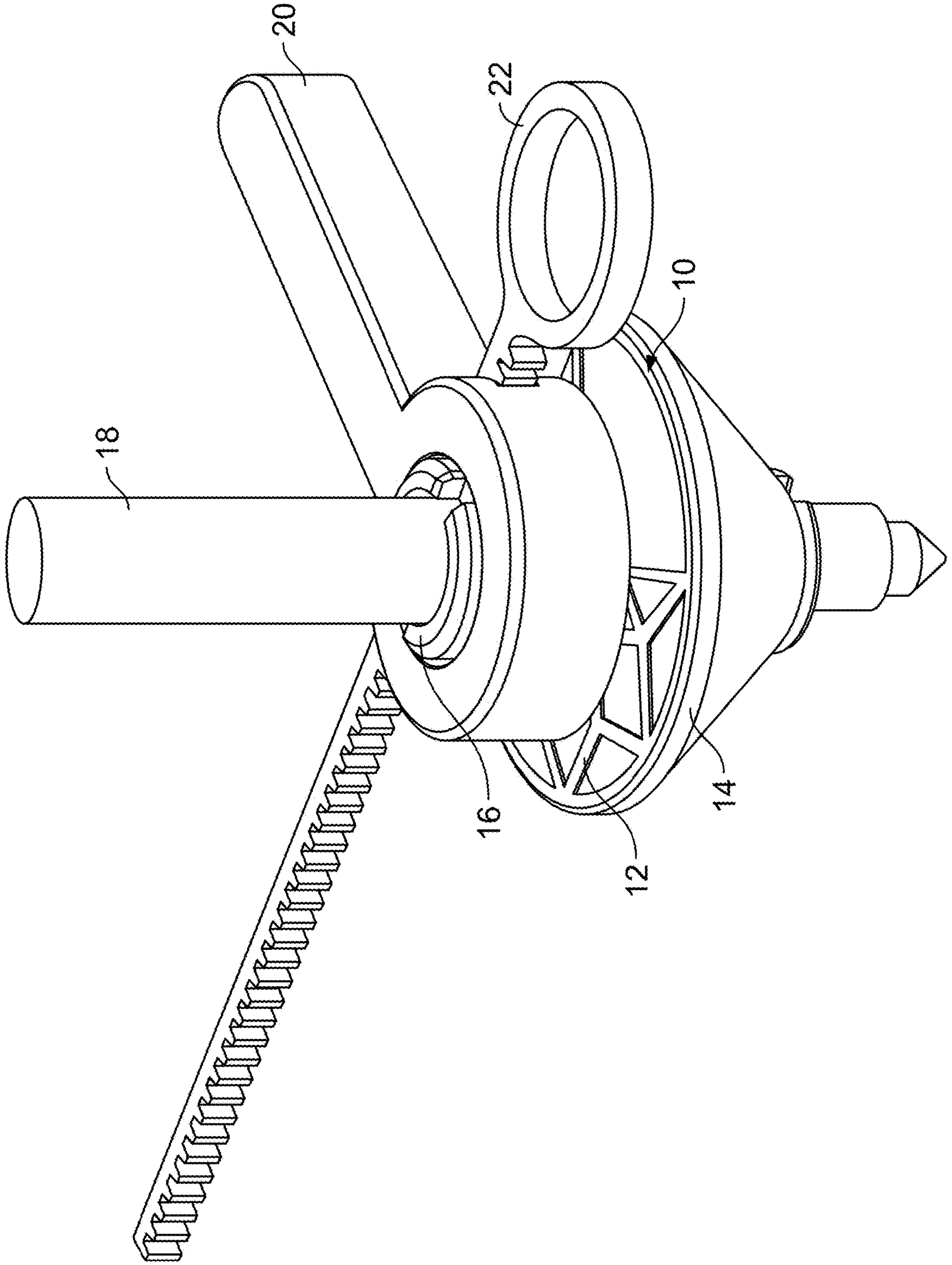
FIG. 1 is a top perspective view of some embodiments of a toy top attachment secured to a writing/drawing instrument.
Figure 1A:
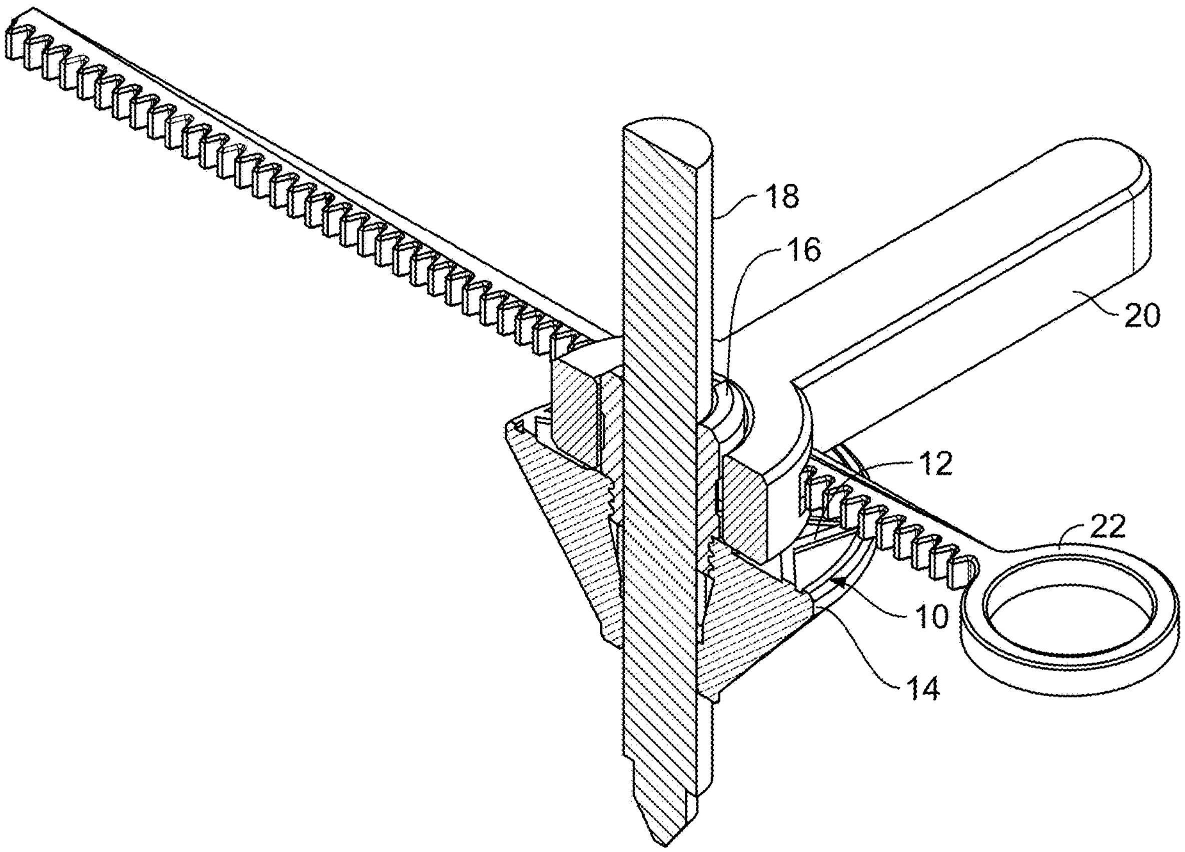
FIGS. 1A and 1B are partial cross-sectional views of some embodiments of the toy top attachment illustrated in FIG. 1.
Figure 1B:
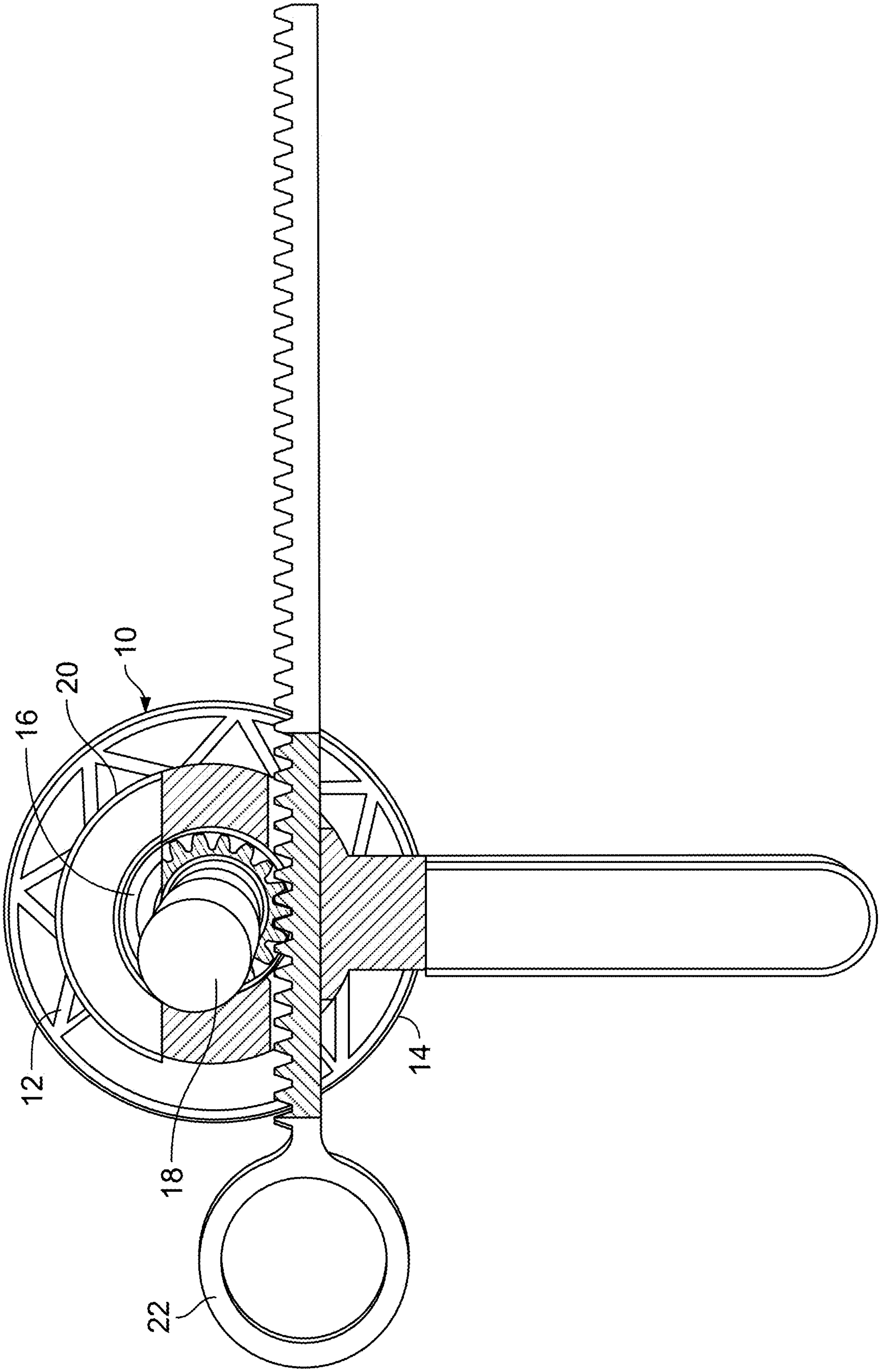
Figure 2A:
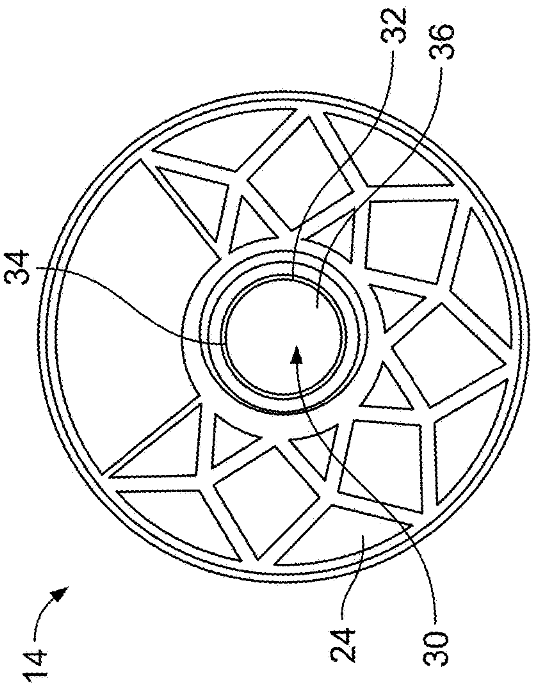
FIGS. 2A through 2D are top plan, bottom plan, side elevational, and top perspective views, respectively, of some embodiments of a top base employed by the toy top attachment illustrated in FIG. 1.
Figure 2B:
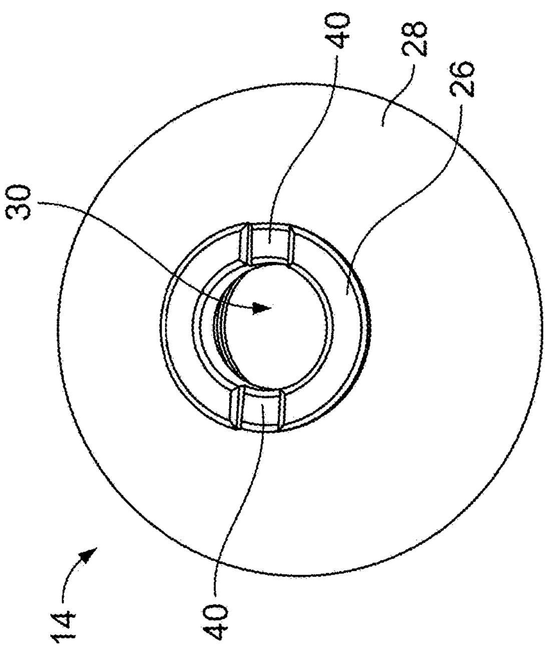
Figure 2C:
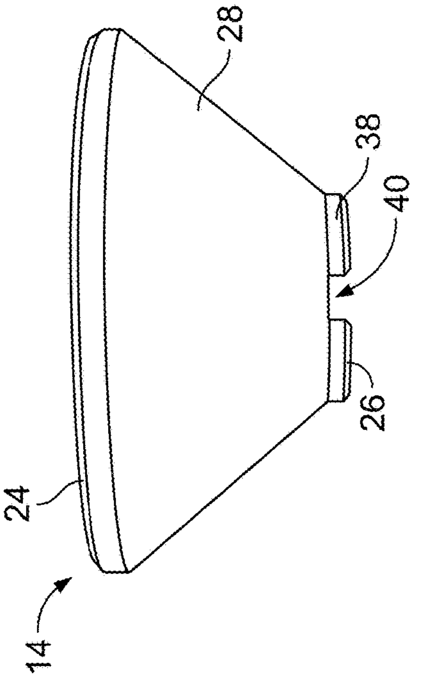
Figure 2D:
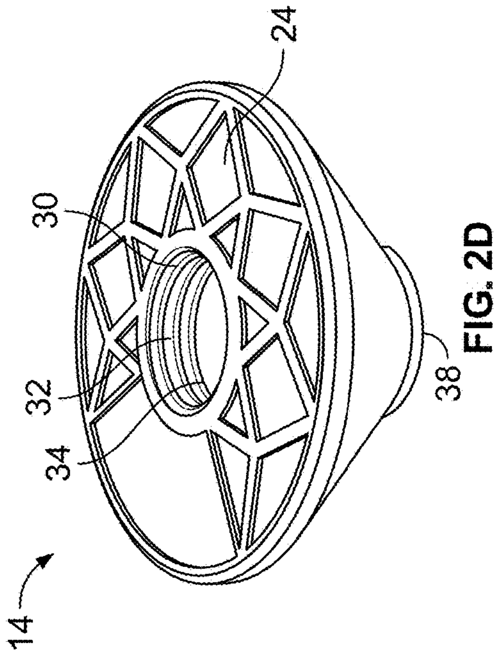

Referring to FIG. 1 and FIGS. 1A and 1B, in some embodiments, in general, a spinning top attachment device 10 includes a top 12 composed of a top base 14 and a collet 16 attached to the top base 14. In some embodiments, the collet 16 is removably attached to the top base 14. In some embodiments, the collet 16 is integral with the top base 14.

In some embodiments, the top 12 is configured to receive a writing/drawing instrument 18. In some embodiments, the top 12 is configured to removably secure the writing/drawing instrument 18. In some embodiments, the spinning top attachment device 10 includes a handle 20 attached to the collet 16 of the top 12. In some embodiments, the handle 20 is removably attached to the collet 16. In some embodiments, a pull stick 22 is removably received within the handle 20 and engages the collet 16. In some embodiments, the pull stick 22 is pulled out from the handle 20 by a pulling force of a user, and the pull stick 22 engages the collet 16 to cause it to rotatably spin the top 12 and the writing/drawing instrument 18. In some embodiments, the top 12 maintains its rotation and drops out of engagement with the handle 20 and onto a drawing surface. In some embodiments, the writing/drawing instrument 18 rotates on the drawing surface and creates and draws designs thereon, such as spirals and curves. Each of the components of the spinning top attachment device 10 will be described herein below.

Referring to FIGS. 2A through 2D, in some embodiments, the top base 14 includes a first, upper end 24, a second, lower end 26 opposite the upper end 24, a sidewall 28 extending from the upper end 24 proximate to the lower end 26, and a bore 30 extending from the upper end 24 to the lower end 26. In some embodiments, the top base 14 is frustoconical in shape. In some embodiments, the top base 14 is conical in shape. In some embodiments, the top base 14 is hemispherical in shape. In some embodiments, the top base 14 is pyramidical in shape. In some embodiments, the top base 14 is frustum in shape. In some embodiments, the top base 14 is cylindrical in shape. In some embodiments, the top base 14 includes any suitable polygonal shape for it to be configured to rotate and spin.

In some embodiments, the bore 30 is sized and shaped to receive the writing/drawing instrument 18. In some embodiments, the top base 14 includes a threaded portion 32 located on an inner surface 34 thereof and within the bore 30. In some embodiments, the threaded portion 32 includes at least one internal thread. In some embodiments, the threaded portion 32 includes a plurality of internal threads. In some embodiments, the threaded portion 32 extends from or proximate from the upper end 24 to a location between the upper end 24 and the lower end 26. In some embodiments, the threaded portion 32 extends from or proximate from the upper end 24 to or proximate to the lower end 26. In some embodiments, a chamfered portion 36 extends within the bore 30 and is located proximate to the lower end 26.

In some embodiments, the top base 14 includes a lip 38 extending from the sidewall 28 at the lower end 26. In some embodiments, the lip 38 includes at least one groove 40. In some embodiments, the at least one groove 40 includes a pair of grooves 40. In some embodiments, each of the pair of grooves 40 is diametrically opposed to one another. In some embodiments, the at least one groove 40 includes a plurality of grooves 40. In some embodiments, the plurality of grooves 40 includes more than two grooves, e.g., three grooves, four grooves, five grooves, six grooves, etc. In some embodiments, as described in further detail below, the grooves 40 are sized and shaped to receive portions of a second wrench 74*b*, which will be described in further detail below.

Figure 3B:
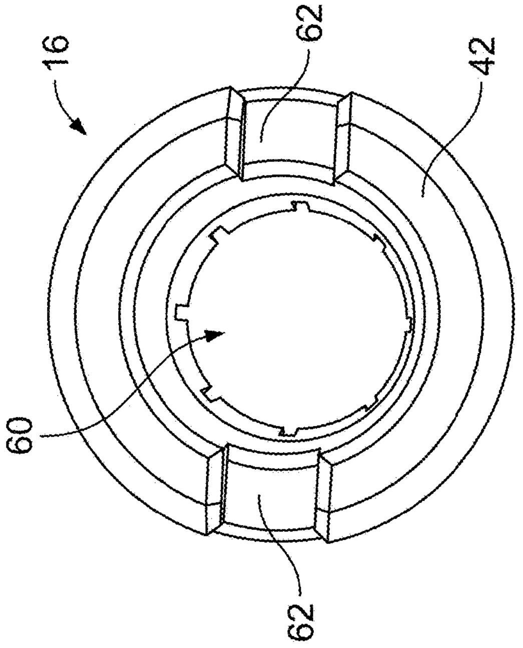
FIGS. 3A through 3C are top plan, bottom plan, and side elevational views, respectively, of some embodiments of a collet employed by the toy top attachment illustrated in FIG. 1.
Figure 3C:
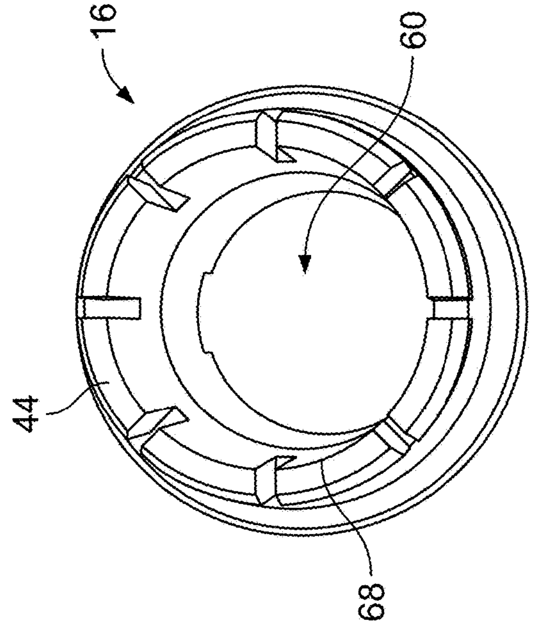
Figure 3A:
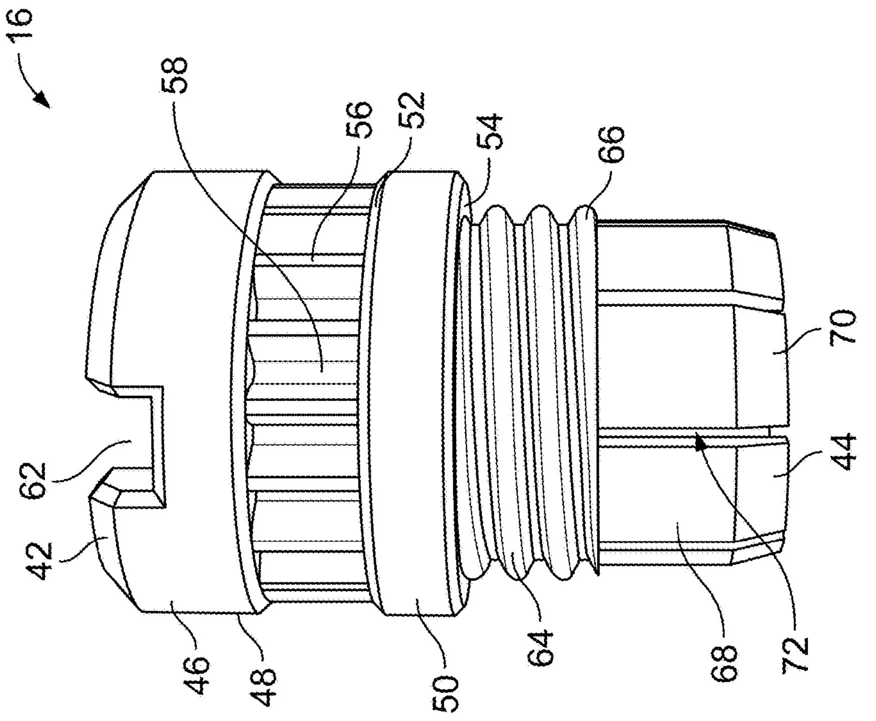

Referring to FIGS. 3A through 3C, in some embodiments, the collet 16 includes a first end 42, a second end 44 opposite the first end 42, a first smooth cylindrical shank portion 46 extending from the first end 42 to a location 48 between the first end 42 and the second end 44, a second smooth cylindrical shank portion 50 extending from a second location 52 between the first end 42 and the second end 44 and a third location 54 between the first end 42 and the second end 44, and a pinion gear portion 56 circumferentially extending and between the first smooth cylindrical shank portion 46 and the second smooth cylindrical shank portion 50. In some embodiments, the pinion gear portion 56 circumferentially extends fully around a circumference of the collet 16. In some embodiments, the pinion gear portion 56 circumferentially extends partially around a circumference of the collet 16. In some embodiments, the pinion gear portion 56 includes a plurality of teeth 58.

In some embodiments, the collet 16 includes a bore 60. In some embodiments, the bore 60 extends from the first end 42 to the second end 44. In some embodiments, the bore 60 is sized and shaped to receive the writing/drawing instrument 18. In some embodiments, the first end 42 includes at least one groove 62. In some embodiments, the at least one groove 62 includes a pair of grooves 62. In some embodiments, each of the pair of grooves 62 is diametrically opposed to one another. In some embodiments, the at least one groove 62 includes a plurality of grooves 62. In some embodiments, the plurality of grooves 62 includes more than two grooves, e.g., three grooves, four grooves, five grooves, six grooves, etc. In some embodiments, as described in further detail below, the grooves 62 are sized and shaped to receive portions of a first wrench 74*a*, which will be described in further detail below. In some embodiments, each of the grooves 62 and each of the grooves 40 of the top base 14 are identical or similar in size and shape.

In some embodiments, the collet 16 includes a threaded portion 64. In some embodiments, the threaded portion 64 includes at least one external thread. In some embodiments, the threaded portion 64 includes a plurality of external threads. In some embodiments, the threaded portion 64 extends from the third location 54 to a fourth location 66 between the first end 42 and the second end 44. In some embodiments, the collet 16 includes a plurality of collet fingers 68. In some embodiments, the plurality of collet fingers 68 extends axially from the fourth location 66. In some embodiments, each of the collet fingers 68 includes a chamfered/tapered, gripping portion 70 at a lower end thereof. In some embodiments, each of the collet fingers 68 are circumferentially separated from one another by a plurality of spaces 72. In some embodiments, the plurality of collet fingers 68 includes at least two fingers. In some embodiments, the plurality of collet fingers 68 includes at least three, four, five, six, seven, eight or more fingers.

Figure 4:
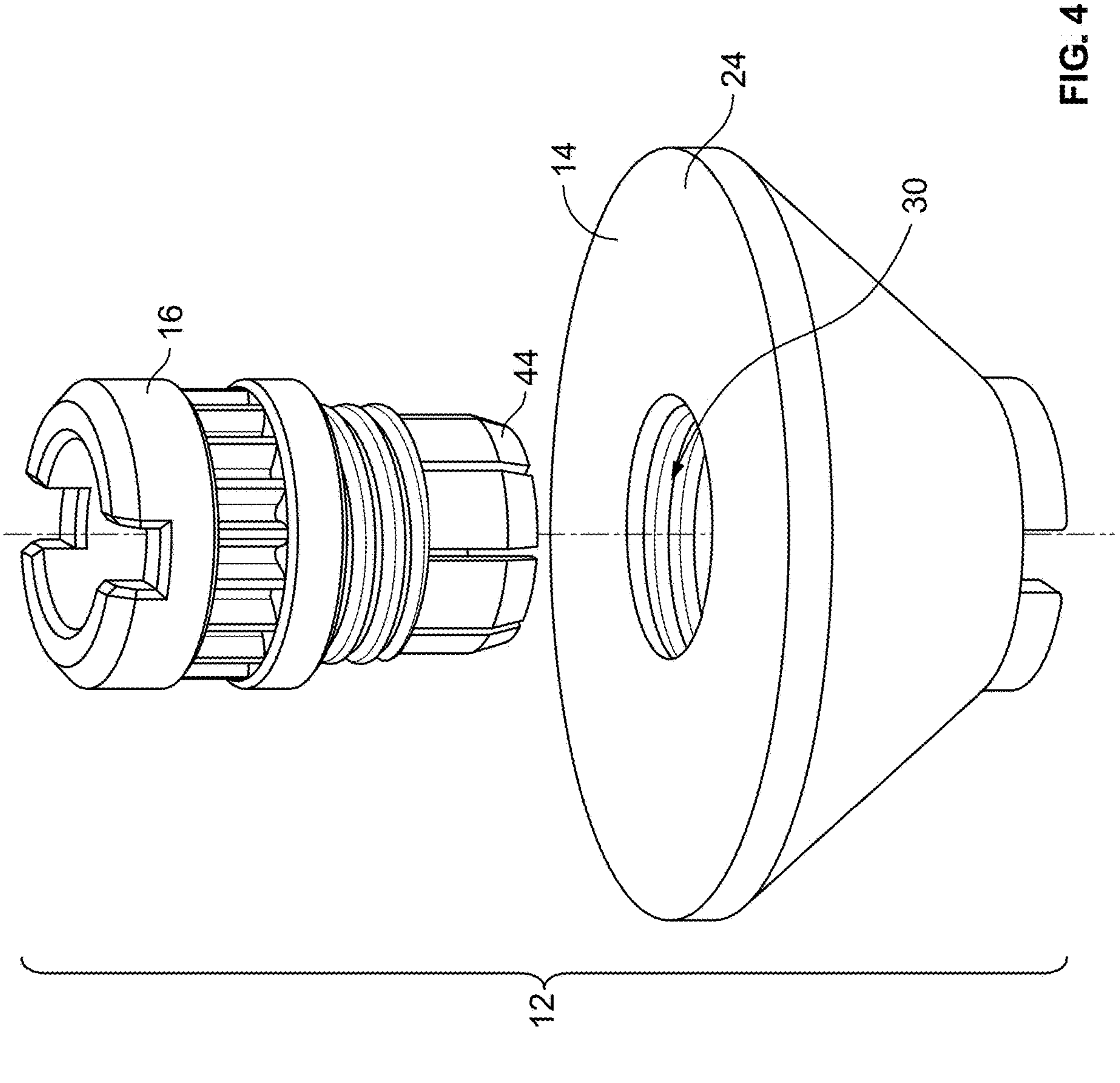
FIG. 4 is an exploded, top perspective view of some embodiments the top base and collet illustrated in FIGS. 2A through 2D and FIGS. 3A through 3C.

Referring to FIG. 4, in some embodiments, the collet 16 is removably attached to the top base 14. In some embodiments, the second end 44 is inserted into the bore 30 of the top base 14 at the upper end 24 thereof. In some embodiments, the collet 16 is threadedly attached to the top base 14 such that the external threads of the threaded portion 64 of the collet 16 threadedly engage the internal threads of the threaded portion 32 of the top base 14. In some embodiments, the collet fingers 68 of the collet 16 are inserted and reside within the bore 30 of the top base 14. In some embodiments, the bore 60 of the collet 16 is coextensive with the bore 30 of the top base 14. In some embodiments, the coextensive bore 30 of the collet 16 and the bore of the top base 14 are sized and shaped to removably receive and secure and retain the writing/drawing instrument 18, which will be described hereinafter.

Figure 5B:
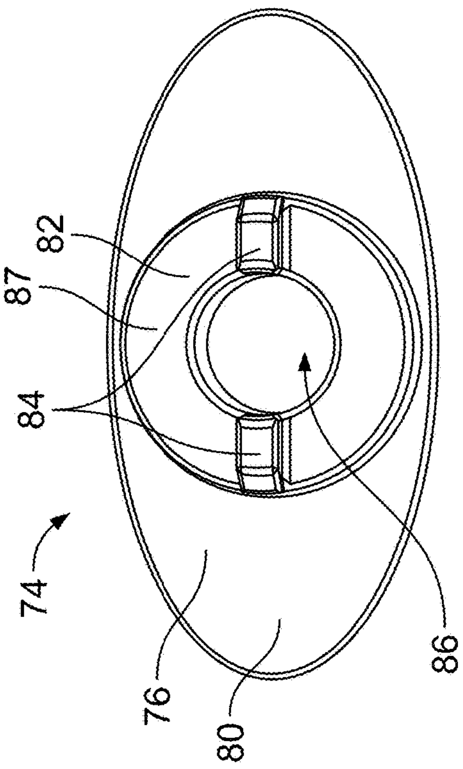
FIGS. 5A through 5C are top plan, bottom plan, and side elevational views, respectively, of some embodiments of a wrench employed for use with the toy top attachment illustrated in FIG. 1.
Figure 5A:
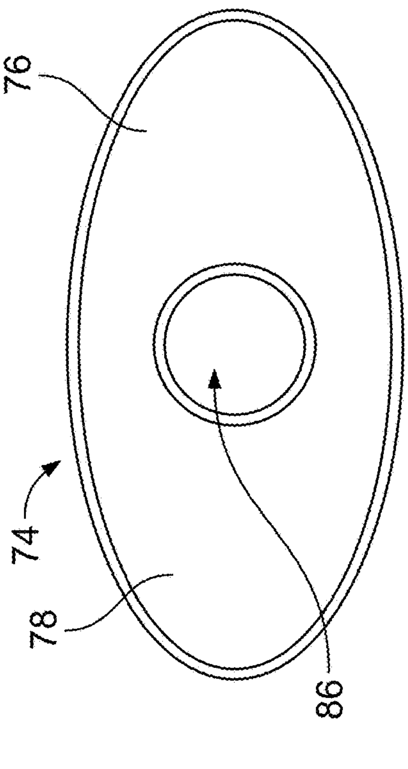
Figure 5C:
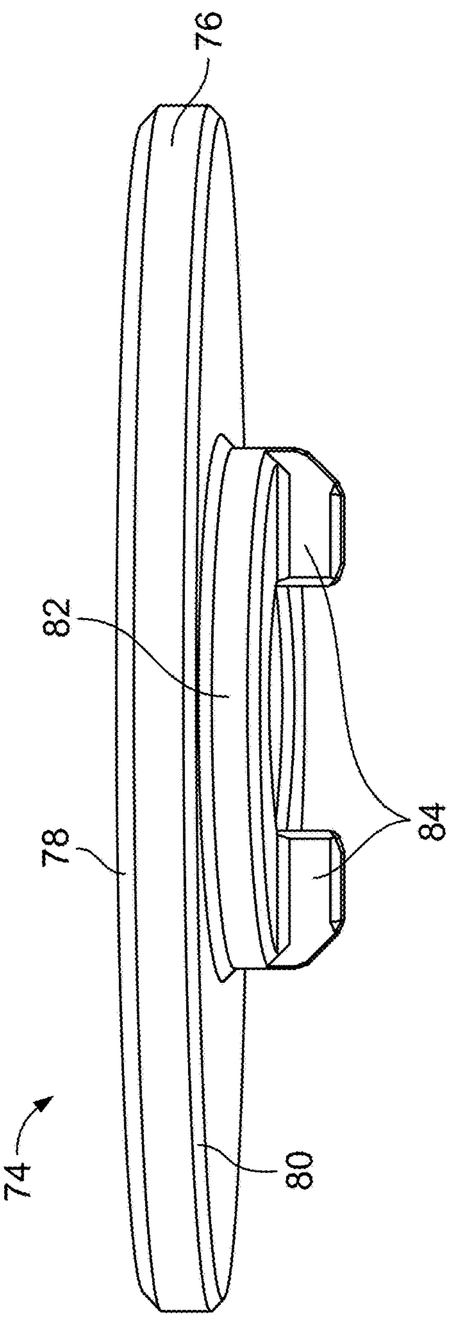

Referring to FIGS. 5A through 5C, in some embodiments, a wrench 74 includes base 76 having a first, upper end 78 and a second, lower end 80 opposite the first, upper end 78. In some embodiments, the base 76 is elliptical in shape. In some embodiments, the base 76 is oval in shape. In some embodiments, the base 76 is circular in shape. In some embodiments, the base 76 is rectangular in shape. In some embodiments, the base 76 is square in shape. In some embodiments, the base 76 is triangular in shape. In some embodiments, the base 76 is T-shaped. In some embodiments, the base 76 is cross-shaped. In some embodiments, the base 76 is polygonal in shape. In some embodiments, the base 76 is non-polygonal in shape.

In some embodiments, a flange 82 extends outwardly from the second, lower end 80 of the base 76. In some embodiments, the flange 82 is circular in shape or disc-shaped. In some embodiments, the flange 82 is elliptical in shape. In some embodiments, the flange 82 is oval in shape. In some embodiments, the flange 82 is circular in shape. In some embodiments, the flange 82 is rectangular in shape. In some embodiments, the flange 82 is square in shape. In some embodiments, the flange 82 is triangular in shape. In some embodiments, the flange 82 is T-shaped. In some embodiments, the flange 82 is cross-shaped. In some embodiments, the flange 82 is polygonal in shape. In some embodiments, the flange 82 is non-polygonal in shape.

In some embodiments, the flange 82 includes at least one tab 84 extending from a lower surface 87 thereof. In some embodiments, the at least one tab 84 includes a pair of tabs 84. In some embodiments, each of the pair of tabs 84 is diametrically opposed to one another. In some embodiments, the at least one tab 84 includes a plurality of tabs 84. In some embodiments, the plurality of tabs 84 includes more than two tabs, e.g., three tabs, four tabs, five tabs, six tabs, etc.

In some embodiments, a bore 86 extends from the first, upper end 78 to the second, lower end 80 and through the flange 82. In some embodiments, the bore 86 has a circular-shaped cross section. In some embodiments, the bore 86 is centrally located. In some embodiments, the bore 86 is sized and shaped to receive therein the writing/drawing instrument 18.

Figure 6:
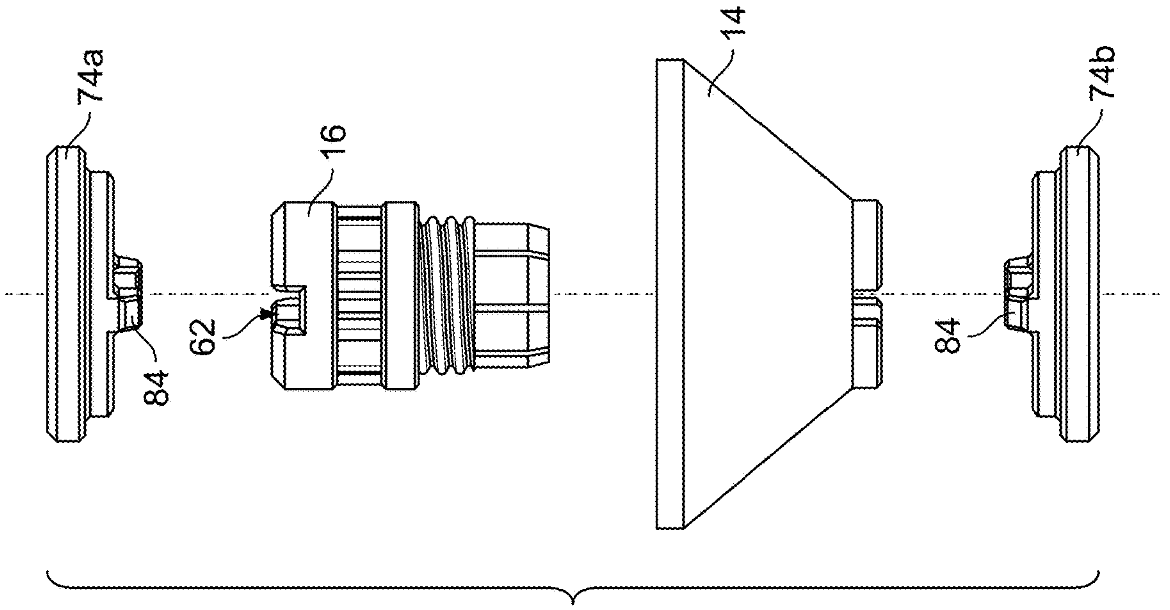
FIG. 6 is an exploded, side elevational view of some embodiments of the top base and collet illustrated in FIGS. 2A through 2D and FIGS. 3A through 3C, and two of the wrenches illustrated in FIGS. 5A through 5C.

Referring to FIG. 6, in some embodiments, a first wrench **74*a* and a second wrench 74*b* are illustrated. In some embodiments, the first wrench 74*a* and the second wrench 74*b* have the structure of that of the wrench 74. In some embodiments, the first wrench 74*a* and the second wrench 74*b* have an identical or similar structure. In some embodiments, the first wrench 74*a* and the second wrench 74*b* are interchangeable. In some embodiments, each of the tabs 84 of a first wrench 74*a* is sized and shaped to mate with and engage a corresponding one of the grooves 62 of the collet 16. In some embodiments, each of the tabs 84 of a second wrench 74*b* is sized and shaped to mate with and engage a corresponding one of the grooves 40 of the top base 14. In some embodiments, the wrenches 74*a*, 74*b* facilitate and enable a user to tighten and untighten the collet 16 with the top base 14 by the corresponding external threads of the collet 16 and the internal threads of the top base 14**.

Figure 7C:
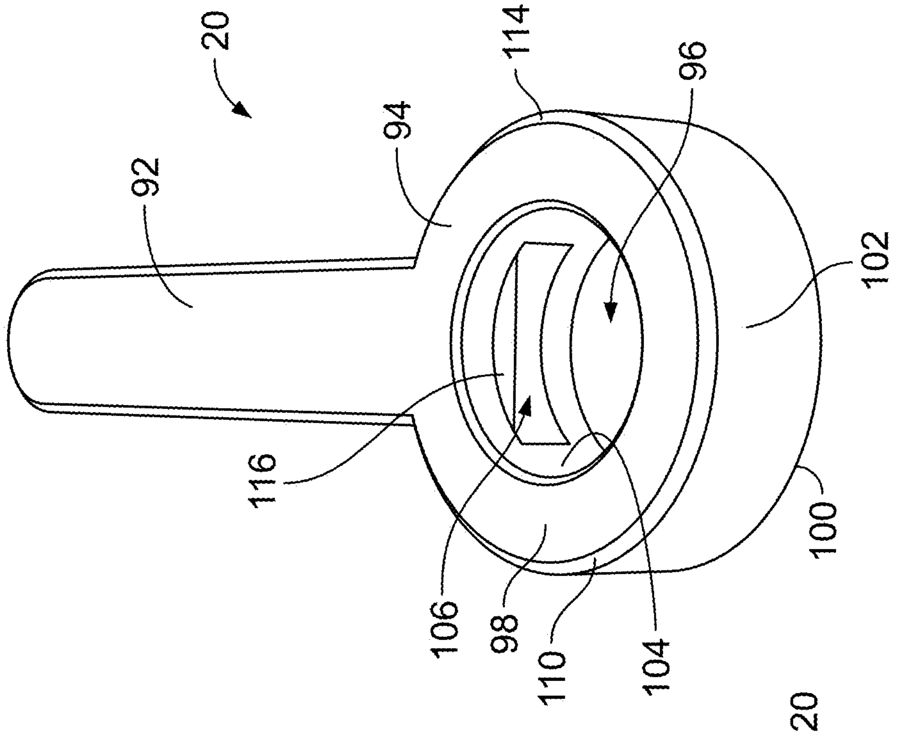
FIGS. 7A through 7C are top plan, side elevational and front perspective views, respectively, of some embodiments of a handle employed by the toy top attachment illustrated in FIG. 1.
Figure 7A:
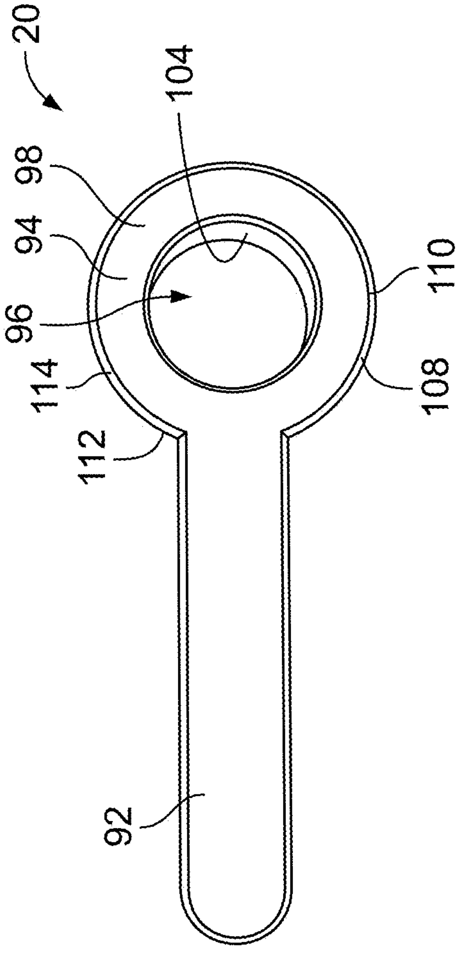
Figure 7B:
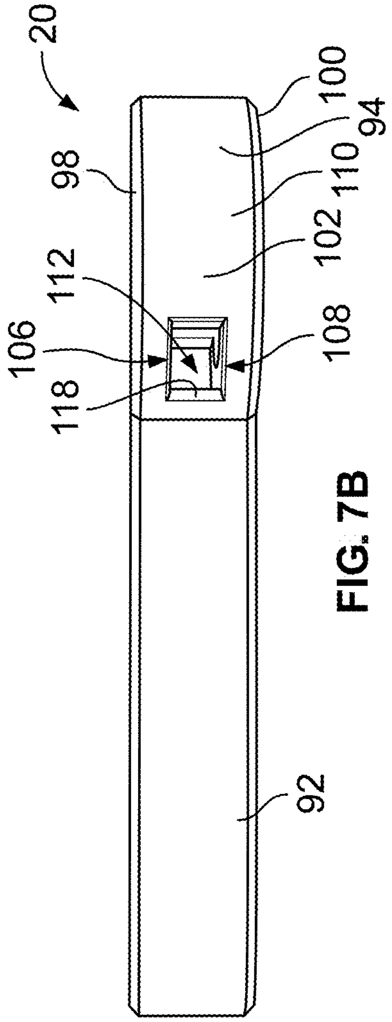

Referring to FIGS. 7A through 7C, in some embodiments, the handle 20 having an elongated portion 92 and a base 94 at one end of the elongated portion 92. In some embodiments, the base 94 includes an aperture 96 extending from a first surface 98 to a second surface 100 of the base 94. In some embodiments, the aperture 96 has a circular-shaped cross-section. In some embodiments, the handle 20 includes an outer sidewall 102. In some embodiments, the base 94 includes an interior wall 104 which forms the aperture 96.

In some embodiments, the base 94 includes a slot 106. In some embodiments, the slot 106 extends from a first opening 108 formed within a first side 110 of the base 94 to a second opening 112 formed within a second side 114 of the base 94 opposite the first side 110. In some embodiments, the slot 106 includes a third, elongated opening 116 extending within the interior wall 104 of the base 94 and proximate to an inner wall end 118 of the elongated portion 92. In some embodiments, the slot 106 is arcuate in shape. In some embodiments, the slot 106 is curvilinear in shape.

Figure 8:
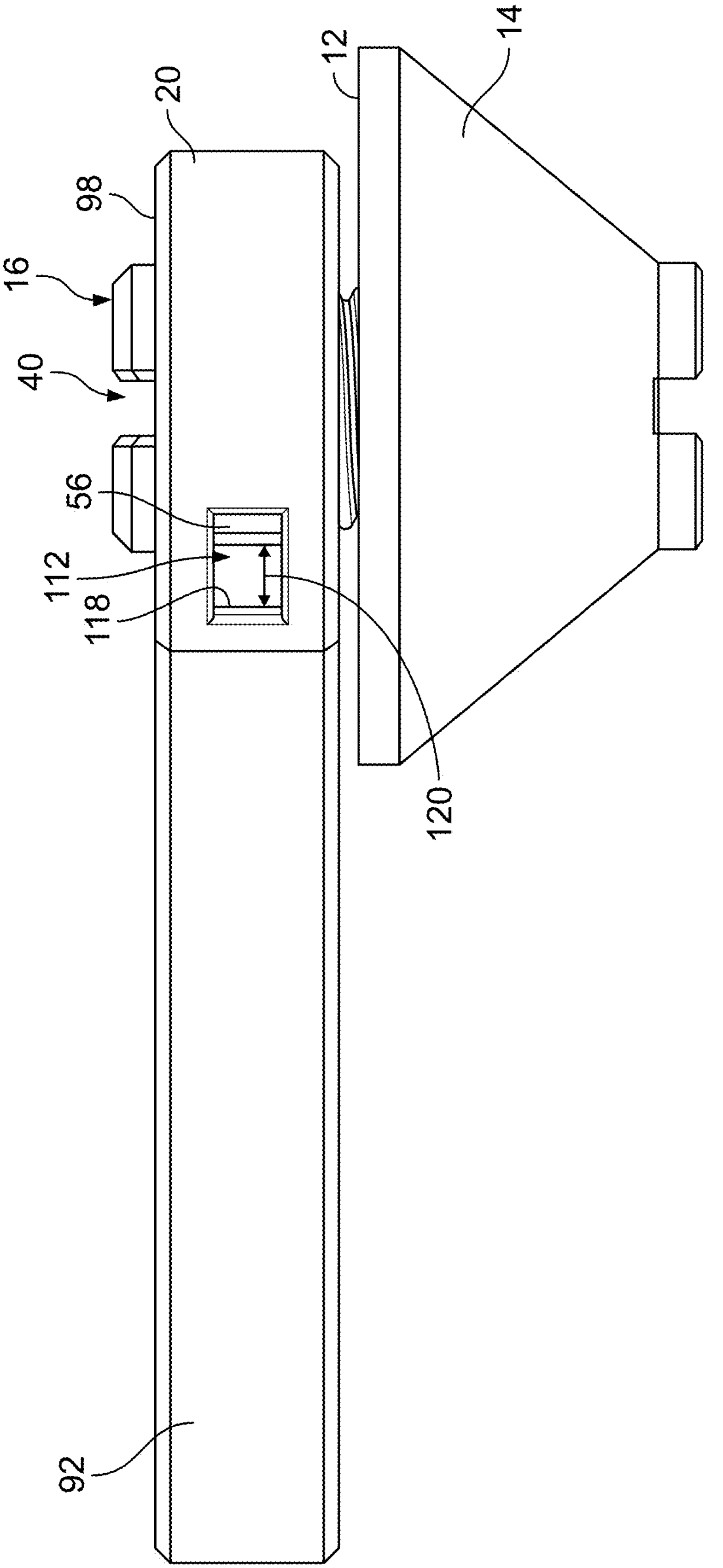
FIG. 8 is a side elevational view of some embodiments of the handle illustrated in FIGS. 7A through 7C attached to the collet and top base.

Referring to FIGS. 1 and 8, in some embodiments, the base 94 is configured to slide on and over the collet 16 of the top 12. In some embodiments, the aperture 96 is sized and shaped to receive the collet 16 therein. In some embodiments, when the collet 16 is installed with the top base 14, the base 94 shrouds the second smooth cylindrical shank portion 50 and the pinion gear portion 56. In some embodiments, at least a portion of the first smooth cylindrical shank portion 46 is shrouded by the base 94. In some embodiments, all or substantially all of the first smooth cylindrical shank portion 46 is shrouded by the base 94. In some embodiments, the grooves 40 are exposed above the first surface 98 of the base 94.

In some embodiments, the teeth 58 of the pinion gear portion 56 of the collet 16 is aligned or substantially aligned with the elongated opening 116 of the slot 106 of the handle 20. In some embodiments, the slot 106, and particularly the first opening 108 and the second opening 112 thereof have a width, and the collet 16 has an outer diameter, which are sized and shaped to provide clearance and a space 120 between the outer diameter of the pinion gear portion 56 and the inner wall end 118 of the elongated portion 92. In some embodiments, the space 120 is sized and shaped to receive the pull stick 22.

Figure 9:
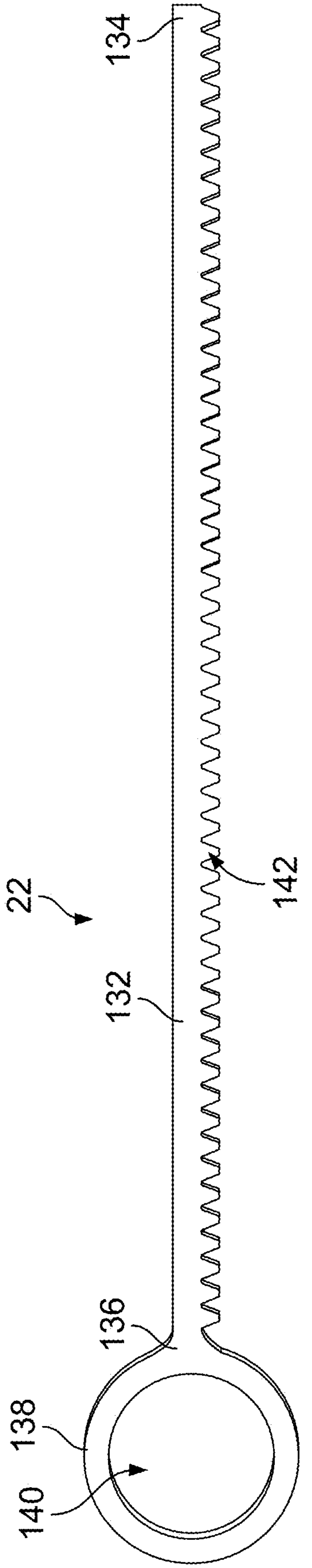
FIG. 9 is a side elevational view of some embodiments of a pull stick employed by the toy top attachment illustrated in FIG. 1.

Referring to FIG. 9, in some embodiments, the pull stick 22 (sometimes referred to as a "rip stick") includes an elongated rack 132 having a first end 134 and a second end 136 opposite the first end 134, and a ring 138 at the second end 136. In some embodiments, the ring 138 includes an aperture 140 that is sized and shaped to receive one or more fingers of a user's hand to manually pull the pull stick 22, as described hereinafter. In some embodiments, the rack 132 includes a plurality of teeth 142. In some embodiments, the teeth 142 extend from the first end 134 to the second end 136. In some embodiments, the teeth 142 extend between the first end 134 and the second end 136. In some embodiments, the rack 132 is flexible. In some embodiments, the rack 132 is rigid. In some embodiments, the teeth 142 of the pull stick 22 are sized and shaped to mesh with the teeth 58 of the pinion gear portion 56 of the collet 16. In some embodiments, the rack 132 is sized and shaped to be removably inserted within the slot 106 of the handle 20. In some embodiments, the first end 134 of the pull stick 22 is inserted within the first opening 108 of the slot 106 in the first side 110 and therethrough the space 120 and extends out of the second opening 112 of the slot 106 and protrudes outwardly from the second side 114. In some embodiments, the teeth 142 of the pull stick 22 mesh with the teeth 58 of the pinion gear portion 56 of the collet 16.

Figure 10:
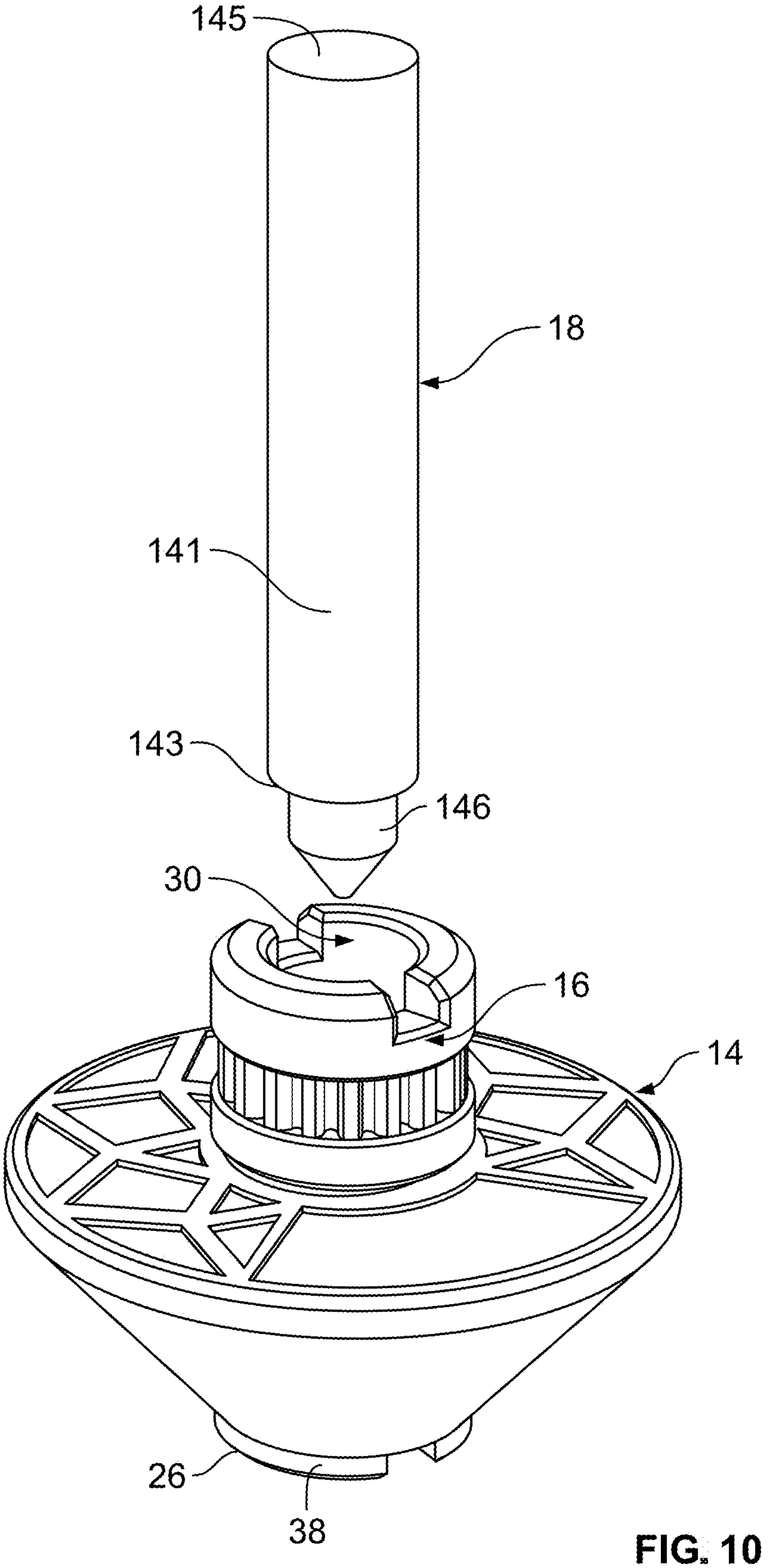
FIG. 10 is an exploded, top perspective view of some embodiments of the top base and collet receiving a writing/drawing instrument.

Referring to FIG. 10, in some embodiments, the collet 16 is screwed into the top base 14 to form the top 12. In some embodiments, the collet 16 is not initially fully screwed or tightened with the top base 14 so that the collet fingers 68 are in an open position. In some embodiments, the writing/drawing instrument 18 is inserted within the top 12. More particularly, the writing/drawing instrument 18 is inserted within the bore 30 of the collet 16 and the bore 60 of the top base 14.

In some embodiments, the writing/drawing instrument 18 includes a housing 141 having a first end 143, a second end 145 opposite the first end 143, and a writing/drawing tip 146 at the first end 143. In some embodiments, the housing 141 is cylindrical or substantially cylindrical in shape. In some embodiments, the writing/drawing instrument 18 is a marker. In some embodiments, the writing/drawing instrument 18 is a broad tip marker. In some embodiments, the writing/drawing instrument 18 is a pen. In some embodiments, the writing/drawing instrument 18 is a pencil. In some embodiments, the writing/drawing instrument 18 is a crayon. In some embodiments, the writing/drawing instrument 18 is a charcoal drawing utensil. In some embodiments, the writing/drawing instrument 18 is chalk. In some embodiments, the writing/drawing instrument 18 may be any other known type. In some embodiments, the writing/drawing instrument 18 may include any typical or known lengths.

As indicated above, the writing/drawing instrument 18 is inserted within the bore 30 of the collet 16 and the bore 60 of the top base 14, with the tip 146 inserted first. In some embodiments, the tip 146 protrudes from the lip 38 at the lower end 26 of the top base 14. In some embodiments, the distance the tip 146 protrudes from the lower end 26 of the top base 14 is adjustable and selectable. In some embodiments, the distance the tip 146 protrudes from the lower end 26 of the top base 14 is adjusted and selected to provide the best balance of the top 12 as possible to spin and rotate it.

Figure 11:
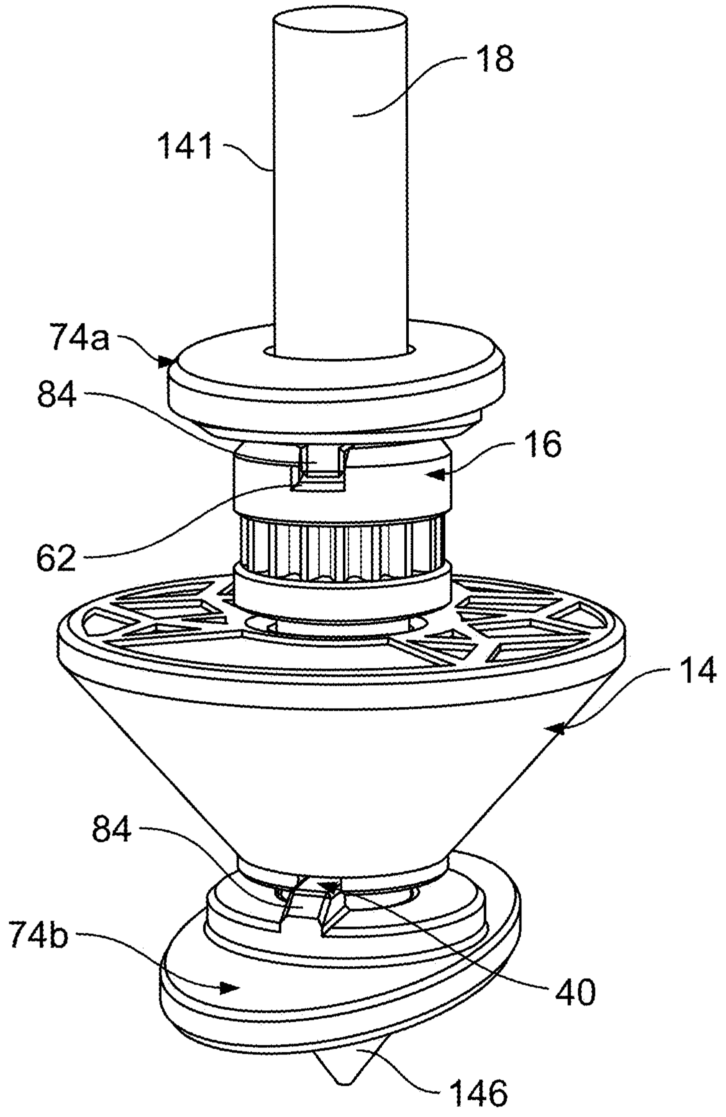
FIG. 11 is a top perspective view of some embodiments of the writing/drawing instrument received by the top base and collet and secured by the wrenches.

Referring to FIG. 11, in some embodiments, the first wrench **74*a* and the second wrench 74*b* are used to tighten the collet 16 to the top base 14 and to secure the writing/drawing instrument 18 within the top 12 at the selected position. In some embodiments, the tabs 84 of the first wrench 74*a* mate with and engage the corresponding grooves 62 of the collet 16, while the tabs 84 of a second wrench 74*b* mate with and engage the grooves 40 of the top base 14. In some embodiments, the second wrench 74*b* is held in place and the first wrench 74*a* is turned clockwise to tighten the top 12 to the housing 141 writing/drawing instrument 18, that is to tighten the collet 16 onto the writing/drawing instrument 18. In some embodiments, as the first wrench 74*a* tightens the collet 16 to the top base 14, the chamfered gripping portions 70 of the collet fingers 68 of the collet 16 engage the chamfered portion 36 within the bore 30 of the top base 14 and deflect inwardly, and the gripping portions 70 grip the housing 141 of the writing/drawing instrument to secure it to the top 12**.

In some embodiments, the collet 16 is moveable from an advanced position, in which the collet 16 is configured to grip the writing/drawing instrument 18, and a retracted position, in which at least a portion of the collet 16 is retracted from the top base 14 and in which the collet 16 is configured to release the writing/drawing instrument 18. In some embodiments, the first wrench **74*a* is configured to engage and move the collet 16 to and from its retracted position and its advanced position. In some embodiments, the plurality of collet fingers 68 is sized and shaped to grip the writing/drawing instrument 18 when the collet 16** is in its advanced position.

In some embodiments, a user may turn the wrench **74*a* counterclockwise to loosen the collet fingers 68 from the writing/drawing instrument 18 so as to adjust its position axially within the top or to remove it and replace it with another writing/drawing instrument 18 (e.g., another color, another style or type of instrument, etc.). In some embodiments, the writing/drawing instrument 18 is axially moveable relative to the top 12 when the collet 16 is in its retracted position. Once the writing/drawing instrument 18 is secured to the top 12, the first and second wrenches 74*a*, 74*b* are disengaged from the top 12** and set aside.

Figure 12:
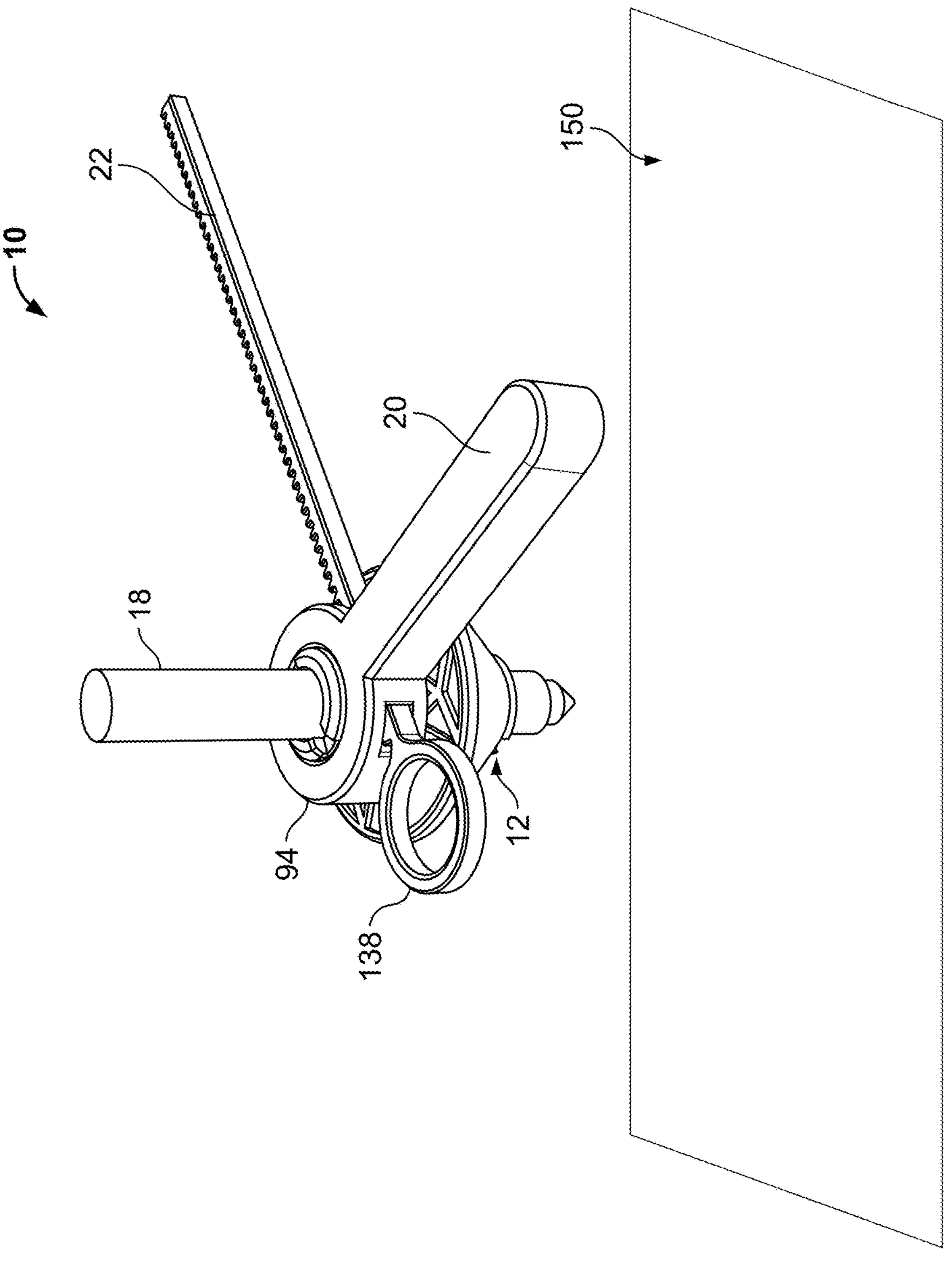
FIG. 12 is a top perspective view of some embodiments of the top attachment secured to the writing/drawing instrument, and including the handle and the pull stick secured thereon over a drawing surface.

Referring to FIG. 12, in some embodiments, the handle 20 is placed over the top 12. More particularly, the base 94 of the handle 20 slides over and surrounds the collet 16. The aperture 96 of the handle 20 is sized and shaped to loosely fit around the collet 16 in a manner and with enough sufficient clearance so as to enable the top to spin relative to the handle 20 as described below. In some embodiments, when the collet 16 is installed with the top base 14, the base 94 shrouds the second smooth cylindrical shank portion 50 and the pinion gear portion 56. In some embodiments, at least a portion of the first smooth cylindrical shank portion 46 is shrouded by the base 94. In some embodiments, all or substantially all of the first smooth cylindrical shank portion 46 is shrouded by the base 94. In some embodiments, the grooves 40 are exposed above the first surface 98 of the base 94 so that they are accessible in the event a user needs to retighten or loosen the collet 16 relative to the top base 14.

In some embodiments, the teeth 58 of the pinion gear portion 56 of the collet 16 is aligned or substantially aligned with the elongated opening 116 of the slot 106 of the handle 20. In some embodiments, the first end 134 of the pull stick 22 is inserted within the first opening 108 of the slot 106 in the first side 110 and through the space 120 and extends out of the second opening 112 of the slot 106 and protrudes outwardly from the second side 114. In some embodiments, the teeth 142 of the pull stick 22 mesh with the teeth 58 of the pinion gear portion 56 of the collet 16. In some embodiments, the pull stick 22 is fully inserted when the ring 138 is proximate to the side of the base 94.

In some embodiments, the spinning top attachment device 10 with the writing/drawing instrument 18 secured is positioned over a drawing surface 150. In some embodiments, the spinning top attachment device 10 with the writing/drawing instrument 18 secured is positioned over the drawing surface 150 anywhere from about 1 inch to about 6 inches (or greater or lesser). In some embodiments, the drawing surface 150 is paper. In some embodiments, the drawing surface 150 is a dry erase board. In some embodiments, the drawing surface 150 is a canvas. In some embodiments, the drawing surface 150 may be any suitable drawing surface known in the art.

Figure 13:
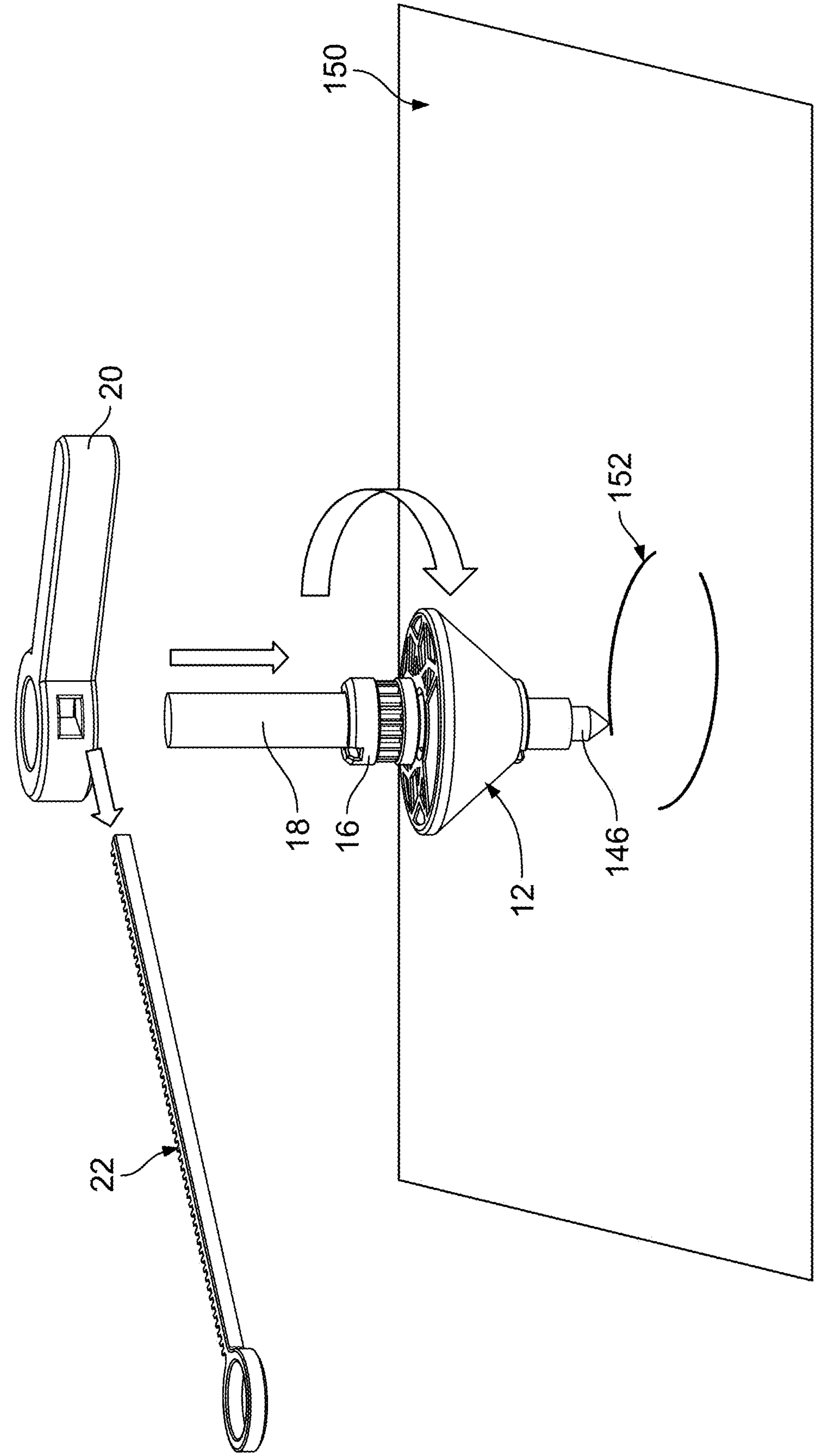
FIG. 13 is a top perspective view of some embodiments of the top attachment secured to the writing/drawing instrument, with the pull stick pulled out therefrom to facilitate rotation of the top attachment and writing/drawing instrument and the handle removed to drop the top attachment and writing/drawing instrument on the drawing surface.

Referring to FIG. 13, in some embodiments, the pull stick 22 is pulled out of the handle 20 with a sufficient force and velocity to make the top 12 and secured writing/drawing instrument 18 spin and rotate. In some embodiments, as the pull stick 22 is pulled out of the handle 20, the quick meshing and unmeshing of the teeth 142 along the pull stick 22 and the rotating of the teeth 58 of the pinion gear portion 56 of the collet 16 cause the top 12 to rotate and spin at a sufficient speed. As indicated above, there is sufficient clearance between the interior wall 104 of the base 94 of the handle 20 and the outer diameter of the collet 16 to enable the top 12 to spin and rotate as the pull stick 22 is pulled. In some embodiments, when the pull stick 22 is completely pulled out and released from the handle 20, the collet 16 disengages from the aperture 96 of the handle 20 by gravity and top 12 and secured writing/drawing instrument 18 continues to rotate and spin and fall onto the drawing surface 150. In some embodiments, the top 12 and writing/drawing instrument 18 assembly spin and rotate at a sufficient velocity such that the tip 146 of the writing/drawing instrument 18 engages the drawing surface 150 and the top 12 and instrument are balanced upright for a period of time. In some embodiments, during the spinning and rotation of the top 12 and the writing/drawing instrument 18, the tip 146 of the instrument creates designs 152 on the drawing surface 150, such as spirals, curves, circles and other designs, shapes, and patterns.

In some embodiments, the collet's 16 clamping features allows users to tighten the writing/drawing instrument 18 at its desired height on the top 12, which results in a different spiral pattern once the top 12 is spun.

In some embodiments, each of the top base 14, the collet 16, the handle 20, the pull stick 22, and/or the wrenches 74 are composed of plastic. In some embodiments, each of the top base 14, the collet 16, the handle 20, the pull stick 22, and/or the wrenches 74 are composed of a polymer. In some embodiments, each of the top base 14, the collet 16, the handle 20, the pull stick 22, and/or the wrenches 74 are composed of metal. In some embodiments, the foregoing components may be manufactured from known techniques including 3D printing, injection molding, and other molding operations.

In some embodiments, each of the top base 14, the collet 16, the handle 20, the pull stick 22, and/or the wrenches 74 are included in a kit. In some embodiments, the kit may include one or more of the writing/drawing instruments 18.

In some embodiments, each of the top base 14, the collet 16, the handle 20, the pull stick 22, and/or the wrenches 74 are included in a system for making artistic and pictorial designs, patterns, graphics, and artwork. In some embodiments, the system may include one or more of the writing/drawing instruments 18.

In some other embodiments, the pull stick 22 could be replaced with another device or method to spin the top 12. In some other embodiments, the shape of the top 12 and particularly the top base 14 can be altered to achieve different spiral effects. In some other embodiments, the method of using the wrenches 74 with grooves to engage and tighten the collet 16 and the top base 14 could be replaced with another device or method to tighten the top pieces together. In some other embodiments, the method of clamping the top onto the writing utensil could be changed from a collet style clamp to another form to hold the writing/drawing instrument 18 secure. In some other embodiments, the bore 30, 60 diameters of the top 12 can be adjusted to allow for any size and shape of writing utensil to be used with the device 10.

What is claimed is:

1. A spinning top attachment device, comprising:
a top including
a top base having
an upper end,
a lower end opposite the upper end,
a bore extending from the upper end to the lower end, and
a collet having
a first end,
a second end opposite the first end,
a bore extending from the first end to the second end, and
a pinion gear portion having a first plurality of teeth,
wherein the collet is removably attached to the top base,
wherein the bore of the collet is coextensive with the bore of the top base,
wherein the bore of the collet and the bore of the top base are sized and shaped to removably receive a drawing instrument, wherein the collet is configured to secure the drawing instrument to the top; and
a pull stick having a second plurality of teeth,
wherein the second plurality of teeth of the pull stick is sized and shaped to mesh with the first plurality of teeth of the pinion gear portion of the collet,
wherein the top and the drawing instrument, when assembled with one another, are configured to spin relative to a surface when the pull stick is pulled relative to the pinion gear portion, and
wherein the drawing instrument is configured to spin on and create a design on the surface.

2. The spinning top attachment device of claim 1, wherein the collet includes a plurality of external threads, wherein the top base includes a plurality of internal threads, and wherein the external threads of the collet threadedly engage the internal threads of the top base.

3. The spinning top attachment device of claim 2, wherein the collet being moveable from an advanced position, in which the collet is configured to grip the drawing instrument, and a retracted position, in which at least a portion of the collet is retracted from the top base and in which the collet is configured to release the drawing instrument.

4. The spinning top attachment device of claim 3, wherein the collet includes a plurality of collet fingers at the second end of the collet, and wherein the plurality of collet fingers is sized and shaped to grip the drawing instrument when the collet is in its advanced position.

5. The spinning top attachment device of claim 3, wherein the drawing instrument is axially moveable relative to the top when the collet is in its retracted position.

6. The spinning top attachment device of claim 3, further comprising a first wrench, wherein the first wrench is configured to engage and move the collet to and from its retracted position and its advanced position.

7. The spinning top attachment device of claim 6, wherein the first end of the collet includes at least one groove, wherein the first wrench includes at least one tab, and wherein the at least one tab of the first wrench is sized and shaped to mate with a corresponding one of the at least one groove of the collet.

8. The spinning top attachment device of claim 6, further comprising a second wrench, wherein the second wrench is configured to engage the top base.

9. The spinning top attachment device of claim 8, wherein the lower end of the top base includes at least one groove, wherein the second wrench includes at least one tab, and wherein the at least one tab of the second wrench is sized and shaped to mate with a corresponding one of the at least one groove of the top base.

10. The spinning top attachment device of claim 1, further comprising a handle having a first end and a second end opposite the first end of the handle, wherein the second end of the handle includes an interior wall forming a first aperture, and wherein the first aperture of the handle is sized and shaped to removably receive the collet.

11. The spinning top attachment device of claim 10, wherein the handle includes a first side, a second side opposite the first side, and a slot extending from the first side to the second side, wherein the slot is sized and shaped to receive the pull stick.

12. The spinning top attachment device of claim 11, wherein the slot extends from a first opening formed within the first side to a second opening formed within the second side, wherein the slot includes a third opening extending within the interior wall, and wherein the first plurality of teeth of the pinion gear portion of the collet is substantially aligned with the third opening of the slot.

13. The spinning top attachment device of claim 12, wherein the slot has a width, wherein the collet has an outer diameter, and wherein the width of the slot and the outer diameter of the collet are sized and shaped to provide a space between the outer diameter of the pinion gear portion and interior wall, and wherein the space is sized and shaped to receive the pull stick.

14. The spinning top attachment device of claim 13, wherein the first aperture of the handle has an inner diameter, wherein the inner diameter of the first aperture provides clearance between the outer diameter of the collet and the interior wall of the handle to enable the top to spin and rotate when the pull stick is pulled.

15. The spinning top attachment device of claim 14, wherein the clearance between the outer diameter of the collet and the interior wall of the handle enables the top to disengage from the handle when the pull stick is fully disengaged from the top.

16. The spinning top attachment device of claim 1, wherein the drawing instrument is a marker, a pen, a pencil, a crayon, chalk, or a charcoal drawing instrument.

17. The spinning top attachment device of claim 1, wherein the drawing instrument includes a tip, and wherein the tip extends from the lower end of the top base.

18. The spinning top attachment device of claim 1, wherein the top base is frustoconical in shape.

19. A kit, comprising:

a top including
a top base having
an upper end,
a lower end opposite the upper end,
a bore extending from the upper end to the lower end, and
a collet having
a first end,
a second end opposite the first end,
a bore extending from the first end to the second end, and
a pinion gear portion having a first plurality of teeth,
wherein the collet is removably attached to the top base,
wherein the bore of the collet is coextensive with the bore of the top base,
wherein the bore of the collet and the bore of the top base are sized and shaped to removably receive a drawing instrument,
wherein the collet is configured to secure the drawing instrument to the top;
at least one wrench, wherein the at least one wrench is configured to attach the collet to the top base and remove the collet from the top base;
a handle having
a first end,
a second end opposite the first end of the handle,
wherein the second end of the handle includes an interior wall forming a first aperture,
wherein the first aperture of the handle is sized and shaped to removably receive the collet, and
a slot formed within the second end of the handle; and
a pull stick having a second plurality of teeth,
wherein the slot of the handle is sized and shaped to receive the pull stick,
wherein the second plurality of teeth of the pull stick is sized and shaped to mesh with the first plurality of teeth of the pinion gear portion of the collet,
wherein the top and the drawing instrument, when assembled with one another, are configured to spin relative to a surface when the pull stick is pulled relative to the pinion gear portion, and
wherein the drawing instrument is configured to spin on and create a design on the surface.

20. A system, comprising:

a drawing instrument; and
a top including
a top base having
an upper end,
a lower end opposite the upper end,
a bore extending from the upper end to the lower end, and
a collet having
a first end,
a second end opposite the first end,
a bore extending from the first end to the second end, and
a pinion gear portion having a first plurality of teeth,
wherein the collet is removably attached to the top base,
wherein the bore of the collet is coextensive with the bore of the top base,
wherein the bore of the collet and the bore of the top base are sized and shaped to removably receive the drawing instrument,
wherein the collet is configured to secure the drawing instrument to the top;
a handle having
a first end,
a second end opposite the first end of the handle,
wherein the second end of the handle includes an interior wall forming a first aperture,
wherein the first aperture of the handle is sized and shaped to removably receive the collet, and
a slot formed within the second end of the handle; and
a pull stick having a second plurality of teeth,
wherein the slot of the handle is sized and shaped to receive the pull stick,
wherein the second plurality of teeth of the pull stick is sized and shaped to mesh with the first plurality of teeth of the pinion gear portion of the collet,
wherein the top and the drawing instrument, when assembled with one another, are configured to spin relative to a surface when the pull stick is pulled relative to the pinion gear portion, and
wherein the drawing instrument is configured to spin on and create a design on the surface.

* * * * *